United States Patent Office 3,838,139
Patented Sept. 24, 1974

3,838,139
CONTINUOUS MASS STYRENE-TYPE MONOMER POLYMERIZATION PROCESS
George A. Latinen, deceased, by May V. Latinen, administratrix, Springfield, Mass., assignor to Monsanto Company, St. Louis, Mo.
Filed Aug. 16, 1971, Ser. No. 172,148
The portion of the term of the patent subsequent to Aug. 7, 1990, has been disclaimed
Int. Cl. C08f 1/04, 7/04
U.S. Cl. 260—88.2 C
4 Claims

ABSTRACT OF THE DISCLOSURE

A continuous mass polymerization process for making polyalkenyl aromatic polymers having a substantially uniform number average molecular weight within the range of from about 20,000 to 100,000 and further having a dispersion index of from about 2.0 to 3.5. Such polymers reduce cycle times in injection molding machines. The process involves a specialized mixing technique during polymerization of monomer to polymer.

BACKGROUND

Figure 1:
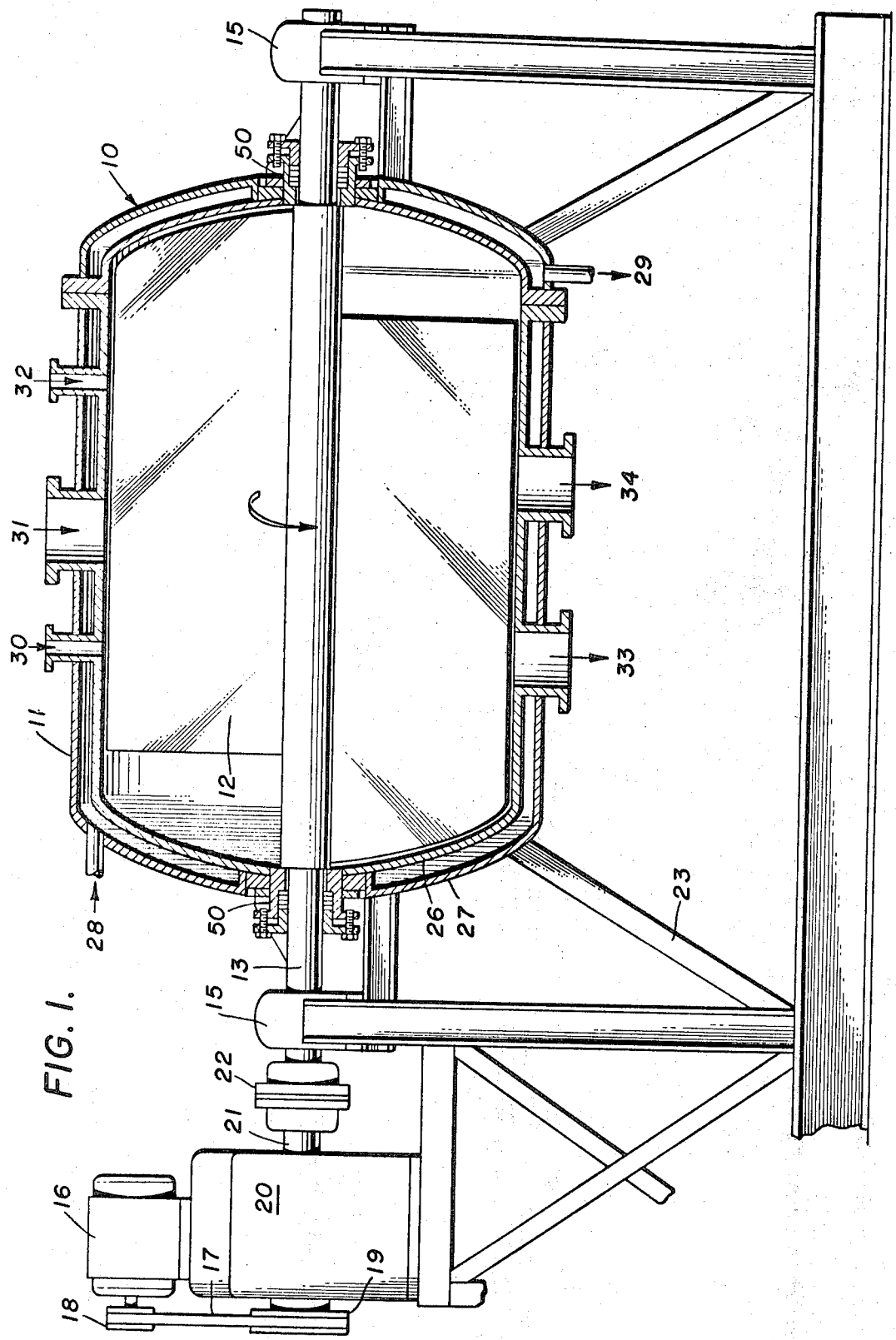

The art of styrene polymerization has long appreciated that polystyrene having a substantially uniform number average molecular weight is highly advantageous for many end use applications, especially those involving injection molding applications. Polystyrene having such a narrow molecular weight distribution characteristically registers a rather sharp melting point as a consequence of which such a polymer softens quickly and hardens quickly when heated above and cooled below, respectively, its melting point. As a practical matter, in injection molding, this physical phenomenon means that set up time (time needed for a molded body to become rigid and self-supporting) is shortened, so that a molded body can be ejected from a mold in a shorter time than when a polystyrene of broader molecular weight distribution is similarly molded.

Since set up time is a primary variable affecting the cycle time of an injection molding machine, a narrow molecular weight distribution in injection molded polystyrene can be a major factor in minimizing machine cycle times. Cycle time reductions of 10 percent or even greater can easily be achieved by the use of polystyrene having a substantially uniform number average molecular weight.

In general, prior art processes for making polystyrene inherently produce polymer having a relatively wide number average molecular weight distribution, significant amounts of polymer molecules deviating as much as 15 or even 20 perecnt on either side of such an average molecular weight being not uncommon.

There has now been discovered, however a process by which one can make by continuous mass polymerization technique polystyrene having a surprisingly narrow but highly average molecular weight distribution. The process is simple to operate and utilizes a specialized mixing procedure and liquid phase expansion.

SUMMARY

The present invention is directed to an improved continuous mass polymerization process for making polyalkenyl aromatic polymers. These polymers are made with molecular weights in the range of from about 20,000 to 100,000 Staudinger and have a dispersion index in the range of from about 2.0 to 3.5. The process involves simultaneously and continuously practicing a plurality of steps.

Thus, one step involves charging to a generally enclosed horizontally elongated reaction zone a monomer composition comprising at least one monoalkenyl aromatic compound of the formula:

where: Ar is selected from the group consisting of a phenyl radical, an alkaryl radical of 6 through 9 carbon atoms, a monochlorophenyl radical, a dichlorophenyl radical, a monobromophenyl radical, and a dibromophenyl radical, and X is selected from the group consisting of hydrogen and an alkyl radical containing less than three carbon atoms.

This monomer composition is so charged at a temperature in the range from about −10 to 50° C.

Another step involves maintaining in such reaction zone a reaction system comprising a liquid phase with a vapor phase thereabove and dispersed within said liquid phase. This liquid phase fills such reaction zone to an extent of from about 10 to 90 percent by volume when in a substantially non-expanded liquid phase at the temperature of said reaction system. Also, this liquid phase comprises a substantially homogeneous and substantially constant composition comprising from about 10 to 85 weight percent of a polyalkenyl aromatic polymer with the balance up to 100 weight percent thereof being the afore-described monomer composition. The vapor phase comprises this monomer composition. The reaction system itself is maintained under substantially isothermal conditions at a temperature in the range from about 130 to 180° C. and at a pressure in the range from about 5 to 20 p.s.i.a. such that the volume of said liquid phase is expanded by said vapor phase at least about 5 percent (preferably at least about 10 percent) over the volume thereof in a substantially non-expanded form (e.g. at a somewhat higher pressure but at the same temperature).

Another step involves subjecting said liquid phase in said reaction zone simultaneously to a combination of three different types of mixing action. One type involves cyclical vertical displacement in said zone such that, at a cycle rate in the range from about ½ to 60 times per minute, (a) first, said liquid phase is subjected to a vertical lifting force greater than that exerted downwardly thereon by gravity, and at least sufficient to move vertically at least about 10 percent of the total volume of said fluid from a gravitationally lower region to a gravitationally higher region in said zone, and
(b) secondly, such so displaced liquid phase is subjected to a gravitational falling force by effective removal of said lifting force therefrom, the total gravitational falling force applied thereon being at least sufficient to return substantially all of such so displaced liquid phase to said gravitationally lower region before said cycle is repeated on such so displaced liquid.

A second type involves rolling action in a generally peripherally located and generally horizontally extending region in said zone, such region extending circumferentially about the entire internal periphery of said zone, and such region being continuously moving in a direction which is generally normal to the horizontal. This rolling action is produced by a similarly so moving band of pressure located adjacent to, but following behind, such region, said band of pressure exerting a force on said liquid phase in said region at least sufficient to cause movement of a portion of said liquid phase in said region along a roughly cross-sectionally circular path normally away from the adjacent internal periphery of said zone adjacent to said band of pressure towards the interior of said zone a distance which is generally less than the maximum distance across said zone at a given peripherial position and then back towards said internal periphery forwardly of said band of pressure before moving towards said band of pressure. A shear rate between said internal periphery and said zone of pressure is maintained at least about 5 sec.$^{-1}$.

The third type involves horizontal displacement in said zone in a longitudinal circulatory manner at a cycle rate such that the actual volume of said liquid phase moved from one end region of said treating zone to the opposite end region thereof and back within one minute is equivalent to from about 1/10 to 30 times the total volume of said liquid phase in said zone. Such equivalent volume and the horizontal circulation rate for such liquid phase so moved are, respectively, approximately proportional to said cyclical vertical displacement cycle rate in any given instance. Substantially the total volume of said liquid phase in said zone is continuously maintained under laminar flow conditions during all three types of mixing.

Another step involves removing from said vapor phase in said reaction zone such monomer composition in a vaporized form at a rate sufficient to maintain said temperature and said pressure.

Another step involves charging such monomer composition at a rate approximating the total rate at which monomer is polymerized and removed from said reaction zone.

Another step involves removing said liquid phase from said reaction zone at a rate sufficient both to maintain said vapor phase and to maintain said weight percent polystyrene polymer in said liquid phase.

Preferably, the process of this invention is practiced using styrene monomer as the monomer composition.

Alternatively, the process of this invention is practiced using a position comprising at least about 90 weight percent styrene with the balance up to 100 weight percent thereof being alpha-methyl styrene, preferably. Preferably, also, the process of this invention is practiced so that said liquid phase in the reaction zone comprises from about 63 to 69 weight percent homopolystyrene with the balance up to 100 weight percent thereof being styrene monomer. Preferably, in products produced by the practice of this invention, the dispersion index ($M_w/M_n$) ranges from about 2.3 to 3.0 and the polymer molecular weight ranges from about 48,000 to 68,000 Staudinger. Commonly used and even preferred shear rates used in the mixer/reactor are at least about 100 sec.$^{-1}$, and more preferably are at least about 1,000 sec.$^{-1}$. Shear rates of less than about 10,000 sec.$^{-1}$ are preferred.

DRAWINGS

Figure 2:
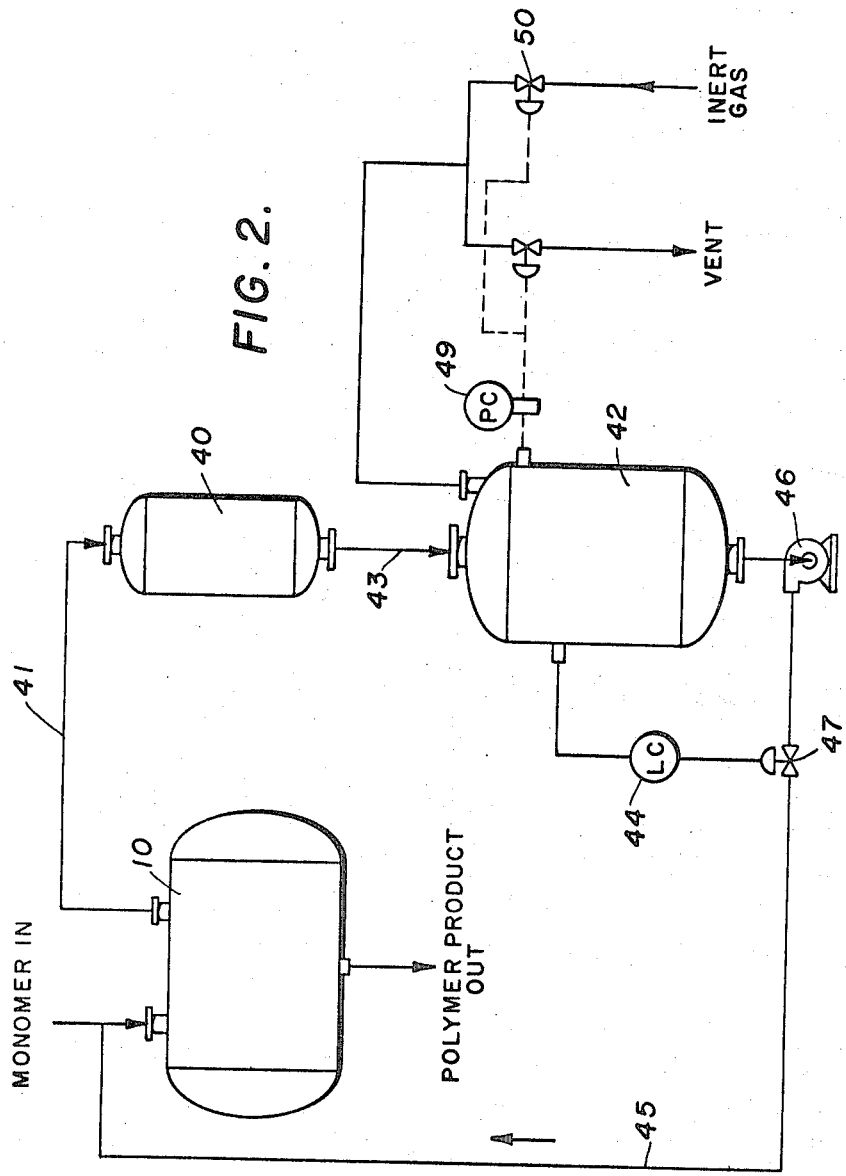

The present invention is better understood by reference to the attached drawings wherein:

FIG. 1 is a diagrammatic side elevational view of a horizontal continuously stirred mixer/reactor suitable for use in the practice of the present invention; and FIG. 2 is a diagrammatic view of an apparatus assembly incorporating the mixer/reactor of FIG. 1 into an embodiment of apparatus suitable for the practice of the present invention.

DETAILED DESCRIPTION

Referring to FIG. 1, there is seen, for example, a mixer/reactor assembly of the type disclosed in co-pending application, Ser. No. 172,059 filed of even date herewith in the name of George A Latinen, now U.S. Pat. 3,751,010, herein designated in its entirety by the numeral 10, which utilizes an embodiment of the present invention. Reactor 10 is seen to comprise a vessel assembly 11 having an impeller assembly 12. Impeller 12 extends through vessel 11 on a shaft 13. Where it passes through vessel 11, shaft 13 is sealed by seals 50 (paired). Shaft 13 is journaled for rotational movements by a pair of bearing assemblies 15.

A motor 16 is connected by a belt 17 over sheaves 18 and 19 to a transmission or reducer 20. Transmission 20 has a drive shaft 21 which interconnects with shaft 13 through a coupling 22. The mixer/reactor assembly 10 is supported by a frame 23.

Vessel 11 has an inner wall 26 and spaced therefrom, an outer wall 27, with the space therebetween serving for circulation therethrough of a heating or cooling fluid, as through an input conduit 28 and an output conduit 29. Material (not shown) for mixing and/or reacting may be fed into vessel 11 through conduits 30, 31, and/or 32 continuously or discontinuously and may be removed therefrom through conduits 33 and/or 34 in conventional ways as those skilled in the art will apprecite. For example, if assembly 10 is to be used as a reactor for continuous mass polymerization of a monomer such as styrene, conduit 31 may be connected to a reflux condenser assembly (not shown); styrene may be continuously sprayed into vessel 11 through a conduit 30, mass polymerized in a partially filled vessel 11, and then continuously removed from vessel 11 through conduit 34, agitation being accomplished by the revolution of impeller 12.

Turning to FIG. 2, it is seen that mixer/reactor 10 is connected to a reflux condenser 40 by pipe 41, pipe 41 being interconnected with the top portion of reactor 10. Condensate from condenser 40 passes into receiver 42 through line 43. The level of condensate in receiver 42 is controlled by a level controller 44 so that the fluid level in receiver 42 is maintained at a predetermined level by recycling condensate from receiver 42 to reactor 10 through line 45 via pump 46 and valve 47. The amount of vapor removed from reactor 10 is controlled by pressure controller 49. The pressure controller 49 receives an electric signal output from a pressure transducer in the vapor space of receiver 42. Controller 49 operates a split range pressure controller arrangement. Thus, when the controller 49 sends out a signal which is greater than 50 percent of a set value, the inert gas valve 50 is opened and the vent valve 51 is closed simultaneously and proportionately to the amount of signal received from pressure controller 49, as a result of which inert gas is bled into the receiver 42 and the amount of vapor taken off the reactor through line 41 is reduced. Conversely, when the output signal from pressure controller 49 drops below 50 percent of a set value, the inert gas valve 50 is closed and the vent valve 51 is opened simultaneously and proportionately, depending upon the signal from the pressure controller 49; thus, increasing the flow of vapor from reactor 10 through line 41.

A preferred polyalkenyl aromatic polymer for use in the present invention is styrene. Optionally, the monomer composition charged to a reactor 10 can comprise at least about 90 weight percent alpha methyl styrene with the balance up to 100 weight percent thereof being alpha-methyl styrene. Preferably, the liquid phase in the reactor 10 comprises from about 63 to 69 weight percent homo-polystyrene with the balance up to 100 weight percent thereof being styrene.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated.

EXAMPLE 1

To a horizontal continuously stirred tank reactor of the type shown in FIG. 1 having a paddle assembly of the type likewise shown in FIG. 1 is continuously charged, in liquid spray form, styrene monomer through an input port 31. The total monomer charge rate is about 70.1 pounds/hour and the temperature of the so-charged liquid styrene monomer is about 60 °F. Concurrently, after steady state conditions are achieved, there is continuously withdrawn from the reactor through output ports 33 and 34 a polymerized melt product at a flow rate of about 70.1 pounds/ hour. The polymerized melt product comprises approximately 70 weight percent polystyrene having a number average molecular weight of about 115,000 (about 55,000 Staudinger) dissolved in the balance up to 100 weight percent styrene monomer. The polymer has a dispersion index of about 2.5. The polymerized melt product withdrawn from the reactor has a viscosity of about 40,000 centipoises at about 300° F. at a shear rate of about 10 sec.$^{-1}$. Hold-up time in the reactor is about 4.6 hours and the conversion rate of monomer to polymer in the reactor is about .22 pounds of polymer made per hour per pound of hold up.

The reactor is maintained at about a 65 percent volumetric fillage level based on the substantially unexpanded liquid phase at 300° F. and the paddle assembly rotates therein at about 12 r.p.m. The contents of the reactor are maintained in a substantially homogeneous and substantially isothermal condition at about 300° F. The reactor is jacketed and the fluid circulated in the jacket is maintained at about 300° F.

The reactor is equipped with reflux condenser which is interconnected with the reactor at input port 31. Vaporized styrene monomer is removed from the upper vapor phase portion within the reactor and passed into this condenser (thus passing by an input spray head in input port 31) at about 300° F. The monomer vapor is condensed and sub-cooled to about 60° F. in the reflux condenser and is then returned to the reactor. The rate of monomer vapor removal is adjusted so as to maintain the temperature in the reactor interior at about 300° F. and so as to maintain the pressure in the reactor at about 13.4 p.s.i.a. At this pressure, the volume of the viscous fluid mass in the reactor is found to be expanded by bubbles of monomer vapor therein to an extent of about 15 percent over the volume of this mass when, for example, the pressure thereof is maintained momentarily at about 15 p.s.i.a. (but at about 300° F.) when it is observed that there are substantially no vapor bubbles entrained in the mass. In the reactor, the shear rate is about 10 sec.$^{-1}$, the horizontal displacement rate is about 8 times the equivalent total volume of the liquid phase per minute, and cyclical vertical displacement is about 24 times per minute.

EXAMPLE 2

The procedure of Example 1 is repeated using similar conditions except that the liquid monomer composition charged to the reactor comprises 90 weight percent styrene monomer with the balance up to 100 weight percent thereof being alpha-methyl styrene. The polymer withdrawn from the reactor is found to have a number average molecular weight between 40,000–60,000 and a dispersion index of from about 2.4 to 2.6. The volume of the expanded viscous fluid mass in the reactor is maintained at about 10 percent above the volume of such mass when in a substantially non-expanded form.

EXAMPLE 3

The procedure of Example 1 is repeated using similar conditions except that the liquid monomer composition charged to the reactor comprises 95 weight percent styrene monomer with the balance up to 100 weight percent being monochlorostyrene. The monochlorostyrene comprises a mixture of at least about 65 weight percent ortho-isomer with the balance up to 100 weight percent thereof being largely paraisomer (available from the Dow Chemical Company, commercially).

The polymer withdrawn from the reactor is found to have a number average molecular weight between 40,000–60,000 and a dispersion index of from about 2.4 to 2.6. The volume of the expanded viscous fluid mass in the reactor is maintained at about 10 percent above the volume of such mass when in a substantially non-expanded form.

EXAMPLE 4

The procedure of Example 1 is repeated using similar conditions except that the liquid monomer composition charged to the reactor comprises 95 weight percent styrene monomer with the balance up to 100 weight percent being parabromostyrene.

The polymer withdrawn from the reactor is found to have a number average molecular weight between 40,000–60,000 and a dispersion index of from about 2.4 to 2.6. The volume of the expanded viscous fluid mass in the reactor is maintained at about 10 percent above the volume of such mass when in a substantially non-expanded form.

EXAMPLE 5

The procedure of Example 1 is repeated using similar conditions except that the liquid monomer composition charged to the reactor comprises 95 weight percent styrene monomer with the balance up to 100 weight percent being an impure orthopara-dichlorostyrene.

The polymer withdrawn from the reactor is found to have a number average molecular weight between 40,000–60,000 and a dispersion index of from about 2.4 to 2.6. The volume of the expanded viscous fluid mass in the reactor is maintained at about 10 percent above the volume of such mass when in a substantially non-expanded form.

EXAMPLE 6

The procedure of Example 1 is repeated using styrene monomer except that a shear rate of about 2,000 sec.$^{-1}$ is employed. The volume of the expanded liquid is maintained about 20 percent above the volume of such fluid mass when in a substantially non-expanded form. The polymer product is found to have a molecular weight between 48,000 and 58,000.

In the foregoing examples, molecular weights are in Staudinger values unless otherwise specifically noted.

What is claimed is:

1. In an improved continuous mass polymerization process for making polyalkenyl aromatic polymers having a molecular weight within the range from about 20,000 to 100,000 Staud., and further having a dispersion index of from about 2.0 to 3.5, the improvement which comprises the steps of continuously and simultaneously:

(A) charging to a single generally enclosed horizontally elongated reaction zone a monomer composition comprising at least one monoalkenyl aromatic compound of the formula:

where:
Ar is selected from the group consisting of a phenyl radical, an alkaryl radical of 6 through 9 carbon atoms, a monochlorophenyl radical, a dichlorophenyl radical, a monobromophenyl radical, and a dibromophenyl radical, and X is selected from the group consisting of hydrogen and an alkyl radical containing less than three carbon atoms, said monomer composition being so charged at a temperature in the range from about −10 to 50° C., (B) maintaining in said reaction zone a reaction system comprising a liquid phase with a vapor phase thereabove and dispersed within said liquid phase, said liquid phase filling said reaction zone to an extent of from about 10 to 90 percent by volume when in a substantially non-expanded liquid phase at the temperature of said reaction system, said liquid phase comprising a substantially homogeneous and substantially constant composition comprising from about 10 to 85 weight percent a polyalkenyl aromatic polymer with the balance up to 100 weight percent thereof being said monomer composition, said vapor phase comprising said monomer composition, said reaction system being maintained under substantially isothermal conditions at a temperature in the range from about 130 to 180° C. and at a pressure in the range from about 5 to 20 p.s.i.a. such that the volume of said liquid phase is expanded by said vapor phase at least about 5 percent over the volume thereof in a substantially non-expanded form, (C) subjecting said liquid phase in said reaction zone to mixing action of a rotating paddle assembly comprising a shaft and at least one pair of diametrically opposed blade members radially projecting to not less than 90 percent of the diameter of said enclosed reaction zone and slotted in their respective diagonally opposite outside corners to an effective slot cross-sectional surface area in each blade member from about 3 to 50 percent of the total effective surface area thereof producing in said liquid phase simultaneously a combination of:

(1) cyclical vertical displacement in said zone such that at a cycle rate in the range from about ½ to 60 times per minute, (a) first, said liquid phase is subjected to a vertical lifting force greater than that exerted downwardly thereon by gravity, and at least sufficient to move vertically at least about 10 percent of the total volume of said fluid from a gravitationally lower region to a gravitationally higher region in said zone, and (b) secondly, such so displaced liquid phase is subjected to a gravitational falling force by effective removal of said lifting force therefrom, the total gravitational falling force applied thereon being at least sufficient to return substantially all of such so displaced liquid phase to said gravitationally lower region before said cycle is repeated on such so displaced liquid, (2) rolling action in a generally peripherally located and generally horizontally extending region in said zone, said region extending circumferentially about the entire internal periphery of said zone, said region being continuously moving in a direction which is generally normal to the horizontal, said rolling action being produced by a similarly so moving band of pressure located adjacent to, but following behind, said region, said band of pressure exerting a force on said liquid phase in said region at least sufficient to cause movement of a portion of said liquid phase in said region along a roughly cross-sectionally circular path normally away from the adjacent internal periphery of said zone adjacent to said band of pressure towards the interior of said zone a distance which is generally less than the maximum distance across said zone at a given peripheral position and then back towards said internal periphery forwardly of said band of pressure before moving towards said band of pressure, there being a shear rate between said internal periphery and said zone of pressure of at least about 5 sec.$^{-1}$, (3) horizontal displacement in said zone in a longitudinal circulatory manner at a cycle rate such that the actual volume of said liquid phase moved from one end of said treating zone to the opposite end thereof and back within one minute is equivalent to from about $\frac{1}{10}$ to 30 times the total volume of said liquid phase in said zone, such equivalent volume and the horizontal circulation rate for such liquid phase so moved, respectively, being approximately proportional to said cyclical vertical displacement cycle rate in any given instance, while continuously maintaining substantially the total volume of said liquid phase in said zone under laminar flow conditions, (D) removing from said vapor phase in said reaction zone said monomer composition in a vaporized form at a rate sufficient to maintain said temperature and said pressure, (E) said charging being at a rate approximating the total rate at which monomer is polymerized and removed from said reaction zone, and (F) removing said liquid phase from said reaction zone at a rate sufficient both to maintain said vapor phase and to maintain said weight percent polystyrene polymer in said liquid phase.

2. The process of Claim 1 wherein said monomer composition comprises styrene.

3. The process of Claim 1 wherein said monomer composition comprises at least about 90 weight percent styrene with the baalnce up to 100 weight percent thereof being alpha-methyl styrene.

4. The process of Claim 1 wherein said liquid phase comprises from about 63 to 69 weight percent homopolystyrene with the balance up to 100 weight percent thereof being styrene.

References Cited

UNITED STATES PATENTS

| | | | |
|---|---|---|---|
| 3,349,070 | 10/1967 | Thayer | 260—93.5 |
| 3,469,948 | 9/1969 | Anderson | 23—285 |
| 3,630,688 | 12/1971 | Takiguchi | 23—285 |
| 3,031,273 | 4/1962 | Latinen | 260—94.9 P |

OTHER REFERENCES

Schildknecht, Calvin E.: *Vinyl and Related Polymers,* pp. 29–34, 1952, John Wiley & Sons, Inc., New York.

Encyclopedia of Polymer Science and Technology, vol. 13, 1971, *Styrene Polymers (Physical Properties),* pp. 243–251, J. Wiley & Sons, New York.

JOSEPH L. SCHOFER, Primary Examiner

E. J. SMITH, Assistant Examiner

U.S. Cl. X.R.

260—93.5 S, 94.9 P